United States Patent
Chen et al.

(10) Patent No.: US 12,477,977 B2
(45) Date of Patent: Nov. 25, 2025

(54) ROBOT LAWN MOWER AND CONTROLLING METHOD THEREOF

(71) Applicant: URSrobot Inc., Taipei (TW)

(72) Inventors: Chien-Tung Chen, Taipei (TW);
Chung-Hou Wu, Taipei (TW);
Chao-Cheng Chen, Taipei (TW)

(73) Assignee: URSrobot Inc., Taipei (TW)

( * ) Notice: Subject to any disclaimer, the term of this patent is extended or adjusted under 35 U.S.C. 154(b) by 489 days.

(21) Appl. No.: 18/086,124

(22) Filed: Dec. 21, 2022

(65) Prior Publication Data

US 2023/0210049 A1    Jul. 6, 2023

(30) Foreign Application Priority Data

Jan. 3, 2022    (TW) .................................. 111100120

(51) Int. Cl.
*A01D 34/00*    (2006.01)

(52) U.S. Cl.
CPC .................................. *A01D 34/008* (2013.01)

(58) Field of Classification Search
CPC ... A01D 34/008; A01D 2101/00; A01D 34/66
See application file for complete search history.

(56) References Cited

U.S. PATENT DOCUMENTS

| | | | | |
|---|---|---|---|---|
| 4,919,224 | A * | 4/1990 | Shyu | G05D 1/0255 701/2 |
| 11,134,609 | B2 * | 10/2021 | Willgert | G07C 5/085 |
| 11,758,883 | B2 * | 9/2023 | Helfers, III | A01K 15/021 119/720 |
| 2020/0267903 | A1 * | 8/2020 | Gao | A01D 75/187 |
| 2022/0007570 | A1 * | 1/2022 | Foster | A01D 34/78 |
| 2022/0197295 | A1 * | 6/2022 | Xu | G05D 1/0272 |

* cited by examiner

*Primary Examiner* — Brad Harcourt
(74) *Attorney, Agent, or Firm* — Blank Rome LLP

(57) ABSTRACT

A controlling method of a robot lawn mower includes a mowing procedure, an interruption determining procedure and an interrupting procedure. The interruption determining procedure includes steps of receiving sensing data indicating a current sensing result related to at least one of surrounding environment or an operation status of the robot lawn mower, and determining whether an interruption condition related to at least one of an environment factor or an operation factor of the robot lawn mower is met. When it is determined that the interruption condition is met, the interrupting procedure is executed, and the robot lawn mower moves to a preset standby location.

10 Claims, 6 Drawing Sheets

ROBOT LAWN MOWER AND CONTROLLING METHOD THEREOF

CROSS-REFERENCE TO RELATED APPLICATION

This application claims priority to Taiwanese Invention Patent Application No. 111100120, filed on Jan. 3, 2022.

FIELD

The disclosure relates to a mower, and more particularly to a robot lawn mower and a controlling method thereof.

BACKGROUND

With the development of robotics, a conventional mower can perform lawn mowing operations automatically without human intervention, thereby significantly reducing labor cost.

However, when encountering unexpected situations such as bad weather during mowing, the conventional mower may be damaged if the user fails to send the mower home in time. That is to say, the conventional mower needs to be monitored and managed in a timely manner, which is not convenient to the user.

SUMMARY

Therefore, an object of the disclosure is to provide a controlling method of a robot lawn mower that can alleviate at least one drawback of the prior art.

According to the disclosure, the robot lawn mower includes a chassis, and a cutting device, a sensor unit and a processor that are mounted on the chassis. The processor is electrically connected to the cutting device and the sensor unit. The controlling method is implemented by the processor, and includes a mowing procedure, an interruption determining procedure and an interrupting procedure.

The mowing procedure includes steps of controlling the chassis to move along a predetermined mowing path in a mowing area, and controlling the cutting device to cut grass as the chassis moves along the mowing path.

The interruption determining procedure is to be executed during the mowing procedure, and includes steps of: receiving a sensing data from the sensor unit, wherein the sensing data indicates a current sensing result related to at least one of surrounding environment or an operation status of the robot lawn mower; and determining, based on the sensing data, whether an interruption condition related to at least one of an environment factor or an operation factor of the robot lawn mower is met.

The interrupting procedure is to be executed when it is determined that the interruption condition is met in the interruption determining procedure, and includes steps of controlling the cutting device to stop cutting grass, and controlling the chassis to move to a preset standby location.

Another object of the disclosure is to provide a robot lawn mower that can alleviate at least one drawback of the prior art.

According to the disclosure, the robot lawn mower includes a chassis, and a cutting device, a sensor unit and a processor that are mounted on the chassis. The processor is electrically connected to the cutting device and the sensor unit. The processor is configured to implement the controlling method as described above.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
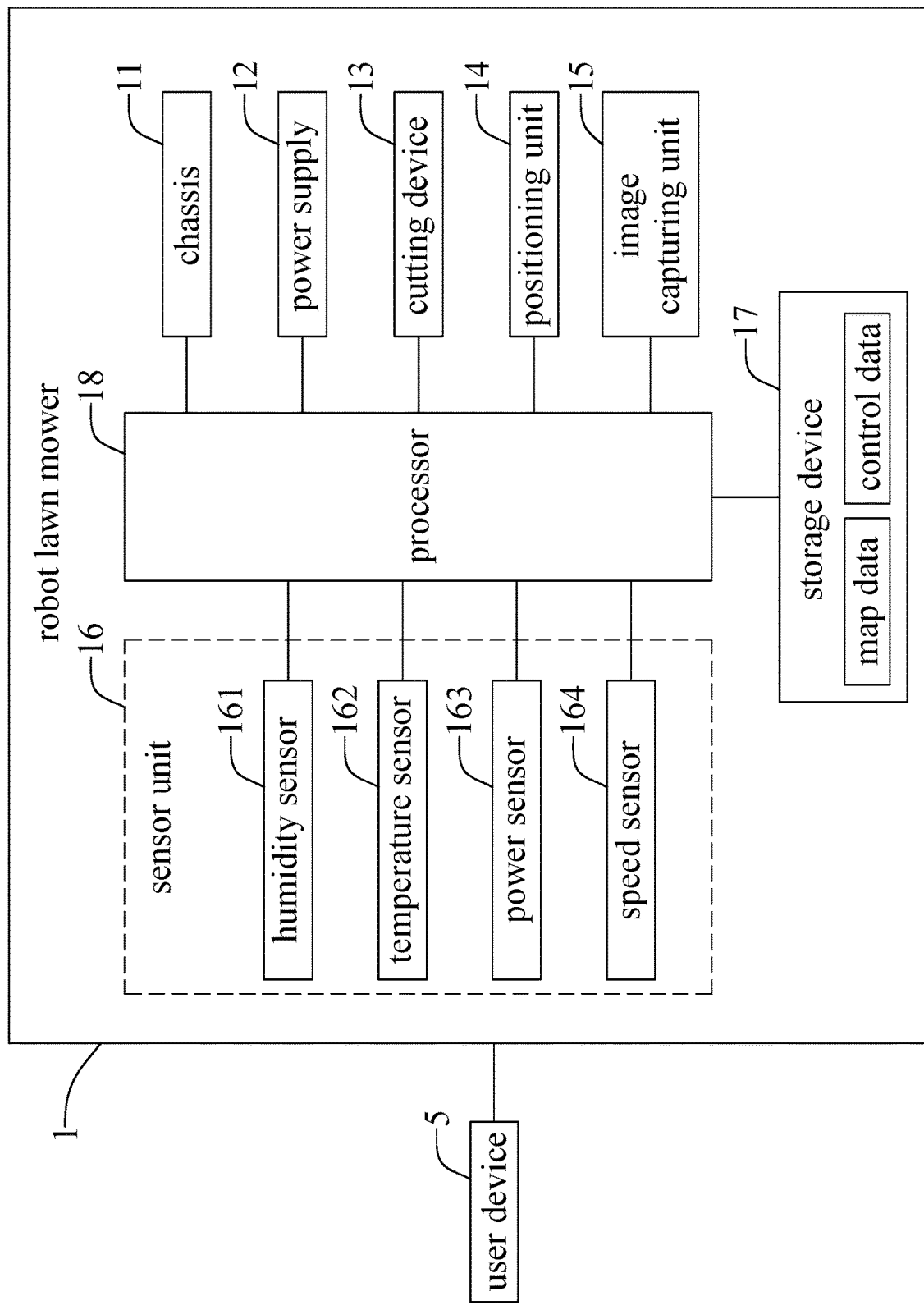
FIG. 1 is a block diagram of a robot lawn mower according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics. Where not specifically defined, the terms "electrical connection" in the disclosure refers generally to a "wired electrical connection" between a plurality of electronic equipment/devices/components connected to each other by conductive materials, or a "wireless electrical connection" for the transmission of one-way/two-way wireless signals by means of wireless communication technologies. Furthermore, the term "electrical connection" also refers to a "direct electrical connection" between multiple electronic equipment/devices/components directly connected to each other, or an "indirect electrical connection" between multiple electronic equipment/devices/components indirectly connected to each other via other electronic equipment/devices/components.

Referring to FIG. 1, an embodiment of a robot lawn mower 1 of the disclosure is adapted to communicate with a user device 5. The user device 5 may be, for example, a smart phone or a computer device, and is operated by a user.

In this embodiment, the robot lawn mower 1 includes a movable chassis 11 that includes a shell (not shown), and a power supply 12, a positioning unit 14, a storage device 17 and a processor 18 that are placed inside the shell. The robot lawn mower 1 further includes a cutting device 13, an image capturing unit 15 and a sensor unit 16 that are mounted on the shell and at least partially exposed out of the shell to conduct their respective functions (detailed below).

The chassis 11 further includes a wheel drive module (not shown) disposed in the shell and electrically connected to the processor 18 so as to be controlled by the processor 18, and a wheel set (not shown) installed on a bottom side of the shell and driven by the wheel drive module. The wheel drive module includes an electric motor for driving the wheel set to roll, and a steering gear for driving wheel(s) of the wheel set to turn. In this way, the chassis 11 can be controlled by the processor 18 to move on the ground via the wheel drive module. The operations of the wheel drive module and the wheel set are known in the art and are not detailed herein.

The power supply 12 is electrically connected to the wheel drive module of the chassis 11, the cutting device 13, the positioning unit 14, the image capturing unit 15, the sensor unit 16, the storage device 17 and the processor 18.

The power supply 12 may be a rechargeable battery pack for storing and providing power required for operations of the robot lawn mower 1.

In this embodiment, the cutting device 13 includes a cutter-driver (not shown) electrically connected to the processor 18, and a cutter (not shown) driven by the cutter-driver. The cutter has a disc and a plurality of blades mounted on the disc. The cutter-driver may be an electric motor and be controlled by the processor 18 to drive the disc to rotate, with the blades cutting grass.

The positioning unit 14 is a real-time positioning device implemented by means of satellite positioning technologies, and is electrically connected to the processor 18 for constantly performing positioning under the control of the processor 18 and generating a set of positioning data accordingly. The set of positioning data may be recorded in a form of a set of latitude and longitude coordinates and represents a current geographical position of the chassis 11. In this embodiment, the positioning unit 14 uses satellite signals from a global navigation satellite system (e.g., the Global Positioning System (GPS)) to achieve real-time satellite positioning. In other embodiments, the positioning unit 14 may use other satellite systems such as BeiDou satellite navigation system (BDS), Galileo positioning system, GLONASS system, etc.

The image capturing unit 15 may be a camera device electrically connected to the processor 18 and captures images of surrounding environment of the chassis 11 under the control of the processor 18.

The sensor unit 16 may include a plurality of sensors electrically connected to the processor 18, and each of the sensors is used to detect a specific physical quantity, generate sensing data indicating the specific physical quantity, and transmit the sensing data to the processor 18. In this embodiment, the sensors include, but are not limited to, a humidity sensor 161 for detecting ambient humidity, a temperature sensor 162 for detecting ambient temperature, a power sensor 163 for detecting remaining power of the power supply 12, and a speed sensor 164 for detecting rotational speed of the cutter, as shown in FIG. 1.

The humidity sensor 161 detects the ambient humidity and accordingly generates sensing data indicating an ambient humidity value. The sensing data indicating the ambient humidity value is then transmitted to the processor 18.

The temperature sensor 162 detects the ambient temperature and accordingly generates sensing data indicating an ambient temperature value. The sensing data indicating the ambient temperature value is then transmitted to the processor 18. In other embodiments, the temperature sensor 162 further detects the temperature of the cutter-driver of the cutting device 13 and accordingly generates sensing data indicating an operating temperature value of the temperature of the cutter-driver.

The power sensor 163 is electrically connected to the power supply 12. The power sensor 163 detects remaining power of the power supply 12 and generates sensing data indicating a remaining power value. The sensing data indicating the remaining power value is then transmitted to the processor 18. In this embodiment, the power sensor 163 may use, but not limited to, the technique of Coulomb Counting to detect the remaining power of the power supply 12. In some embodiments, the power sensor 163 is integrated in the power supply 12.

The speed sensor 164 is placed, for example but not limited to, adjacent to the disc of the cutter of the cutting device 13. In this embodiment, the speed sensor 164 detects rotational speed of the cutter and accordingly generates sensing data indicating a rotational speed value. The sensing data indicating the rotational speed value is transmitted to the processor 18.

Overall, the sensor unit 16 continuously detects and generates the sensing data that indicates current sensing results related to the surrounding environment of the robot lawn mower 1 (including the ambient humidity value and the ambient temperature value), and the sensing data that indicates current sensing results related to an operation status of the robot lawn mower 1 (including the remaining power value, the rotational speed value and the operating temperature value).

The processor 18 is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The storage device 17 is electrically connected to the processor 18, and is implemented as a flash memory device or any other type of storage device (e.g., a hard disk) capable of storing digital data. The storage device 17 stores a set of map data and a set of control data. The set of control data includes critical values of environment factors and critical values of operation factors.

In this embodiment, the environment factors are related to environment of the mowing area A1 and include ambient humidity and ambient temperature; and the critical values of the environment factors include a humidity threshold related to the ambient humidity, and a temperature threshold related to the ambient temperature. The operation factors are related to the robot lawn mower 1, and include remaining power of the power supply 12, rotational speed of the cutter, and temperature of the cutter-driver; and the critical values of the operation factors include a remaining power threshold related to the remaining power of the power supply 12, a rotational speed threshold related to the rotational speed of the cutter, and an operating temperature threshold related to the temperature of the cutter-driver.

The set of map data may be provided by the user device 5. In this embodiment, a specific mowing application is installed on the user device 5. The user device 5 may generate the set of map data through the mowing application according to user operations of marking or selecting areas on an electric map.

Figure 2:
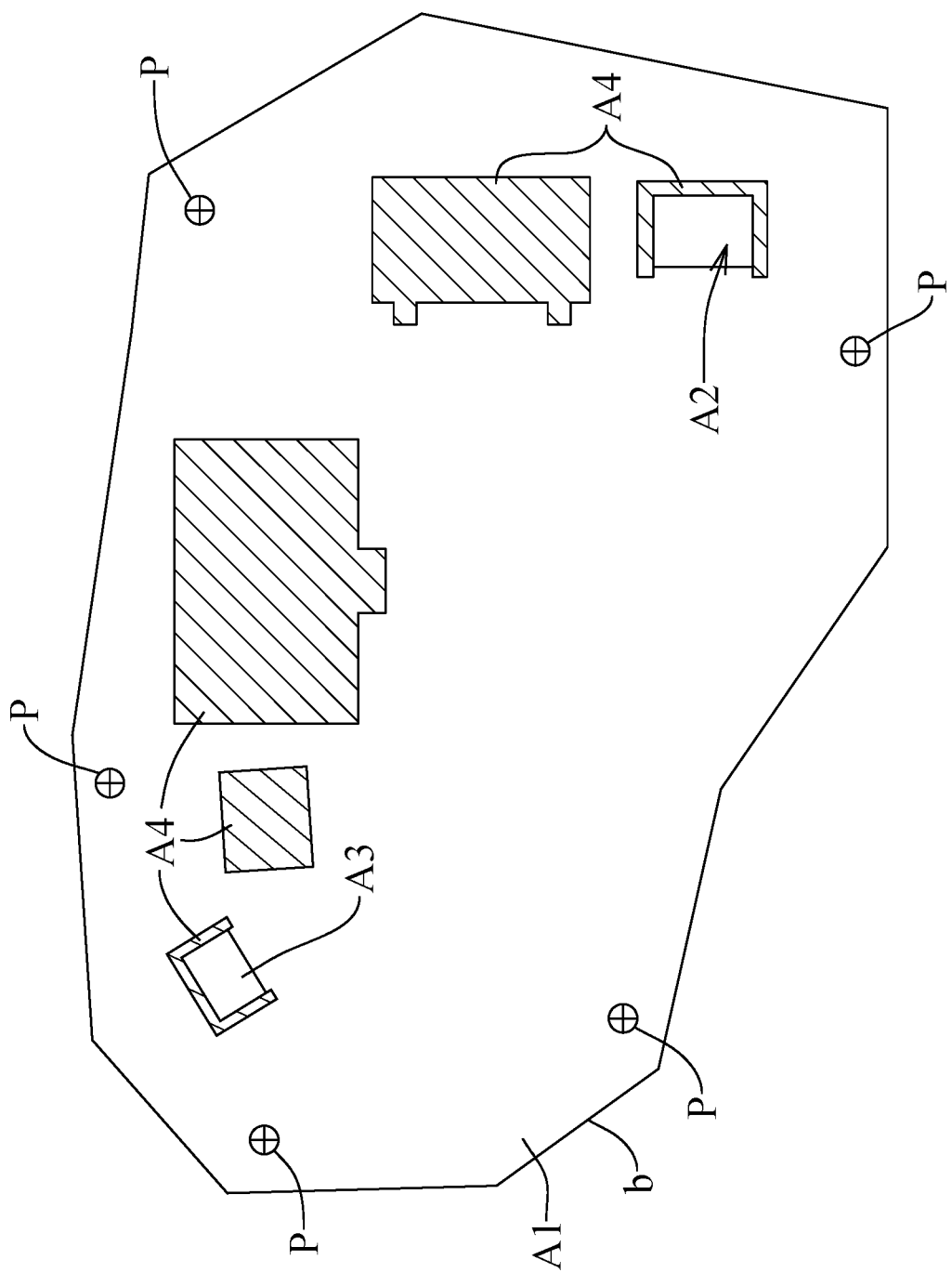
FIG. 2 is a schematic view illustrating a set of map data indicating a mowing area, a docking location, a standby location, a plurality of barrier areas and a plurality of image-capturing locations according to an embodiment of the disclosure.

Referring to FIG. 2, the set of map data, for example, may include a mowing area A1, a preset docking location A2, a preset standby location A3, a plurality of barrier areas A4, and a plurality of preset image-capturing locations (P). The plurality of preset image-capturing locations (P) may be arranged in a specific sequence so that the image capturing unit 15 may accordingly capture images sequentially at the preset image-capturing locations (P). For example, in FIG. 2, the preset image-capturing locations (P) are arranged in a clockwise or counterclockwise direction. In this embodiment, the areas/locations A1 to A4 and (P) are predetermined by the user and are each indicated by a set of latitude and longitude coordinates.

Specifically, the mowing area A1 has a boundary (b), and may be a yard or field where the user wants to lawn grass using the robot lawn mower 1. The docking location A2 may be predefined as an area where the robot lawn mower 1 should automatically go after completing mowing operations, and may be equipped with a charging device capable of charging the power supply 12 of the robot lawn mower 1. The docking location A2 may also be an area dedicated to keeping the robot lawn mower 1 when the user sends the robot lawn mower 1 home. The standby location A3 may be an area where the robot lawn mower 1 should automatically go and stay in the event of an unexpected situation (detailed below). The standby location A3 may be an area with a shelter overhead, such as a veranda, a gazebo or an area under a canopy, or even an indoor area that allows the robot lawn mower 1 to enter and exit freely. Each of the barrier areas A4 indicates an area where there is an obstruction such as a wall, a fence, etc., or an area that is not suitable for passage of the robot lawn mower 1, such as a pool, a staircase, etc. Each of the image-capturing locations (P) is a preferred viewpoint predetermined by the user, and is preset for the robot lawn mower 1 to go to and capture an image with the image capturing unit 15 at.

The docking location A2, the standby location A3, the barrier areas A4 and the image-capturing locations (P) are all located within the boundary (b) of the mowing area A1 in this example as shown in FIG. 2. However, any one or more of the docking location A2, the standby location A3, the barrier areas A4 and the image-capturing locations (P) may be located outside the boundary (b) of the mowing area A1 in other examples.

Further, in some cases where the mowing area A1 is relatively large, the set of map data may include a plurality of the standby locations A3. In some cases where the mowing area A1 is relatively small, the set of map data may include only one image-capturing location (P). The docking location A2 and the standby location A3 may refer to the same area in some embodiments, rather than two separate areas as shown in FIG. 2.

Figure 3:
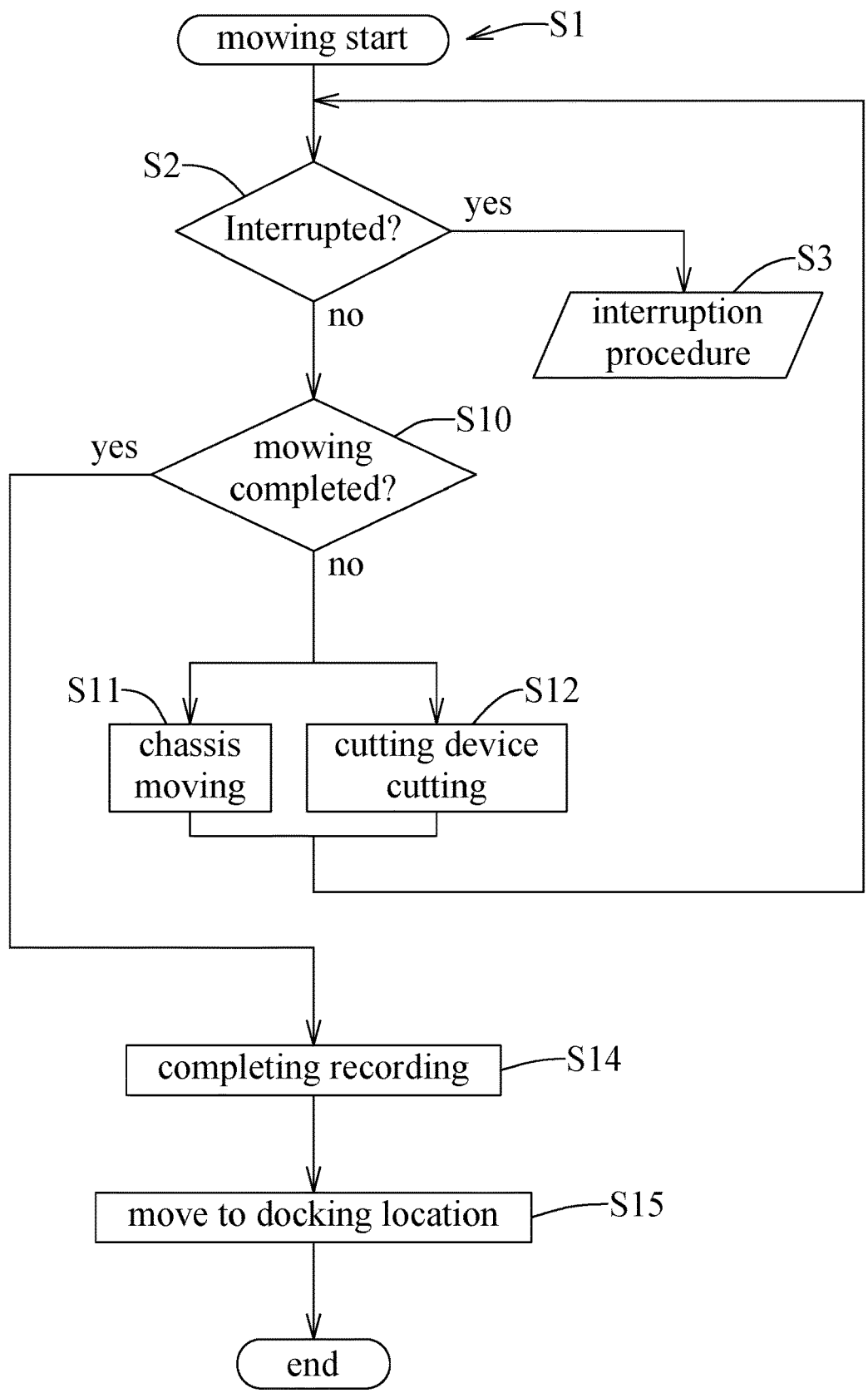
FIGS. 3 to 5 are flow charts illustrating an embodiment of a controlling method implemented by the robot lawn mower.

Referring to FIGS. 1 to 3, the following exemplarily describes how the robot lawn mower 1 of the disclosure implements a controlling method according to an embodiment in detail. The controlling method includes a mowing procedure S1, an interruption determining procedure S2 executed during the mowing procedure S1, and an interrupting procedure S3 executed when it is determined that any one of a plurality of interruption conditions is met in the interruption determining procedure S2.

At the beginning of the mowing procedure S1, the processor 18 controls the positioning unit 14 to perform positioning and generate the set of positioning data, receives the set of map data from the storage device 17, and controls the robot lawn mower 1 to start mowing.

Simultaneously with the mowing procedure S1, the processor 18 is implementing the interruption determining procedure S2.

Figure 4:
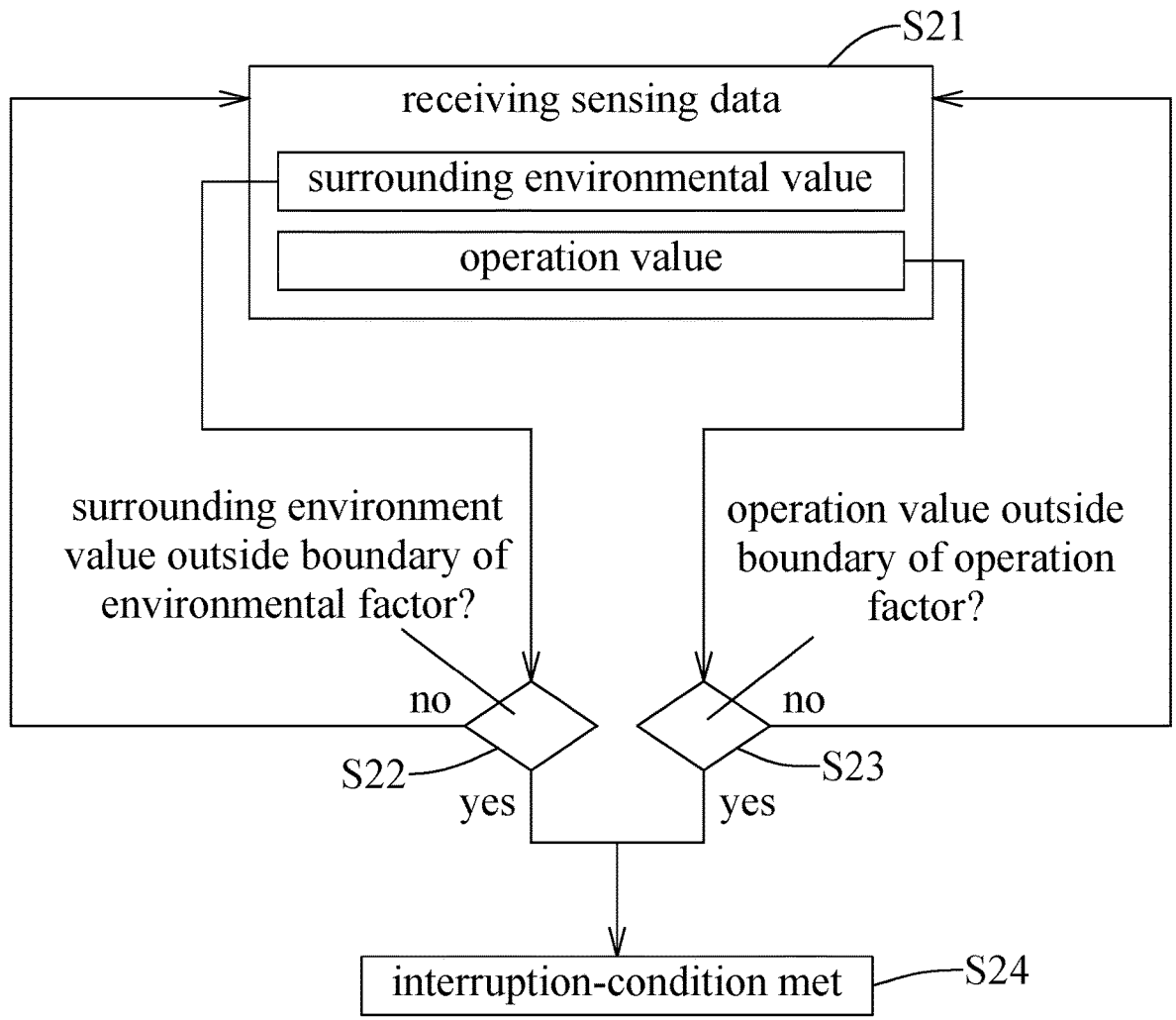

Referring to FIG. 4, the interruption determining procedure S2 includes the following steps. At the beginning of the interruption determining procedure S2, the processor 18 controls the sensor unit 16 to start to detect and generate the sensing data.

In step S21, the processor 18 receives the sensing data from the sensor unit 16. In this embodiment, the sensing data includes the ambient humidity value and the ambient temperature value that serve as environmental values (values related to the surrounding environment), and the remaining power value, the rotational speed value and the operating temperature value that serve as operation values (values related to the operation status). In other embodiments, the sensing data may include only one or some of the above-mentioned values.

In steps S22 and S23, the processor 18 determines, based on the sensing data, whether an interruption condition related to one of the environment factors or an interruption condition related to one of the operation factors of the robot lawn mower 1 is met. When any of the interruption conditions is met (S24), the mowing procedure S1 should be interrupted, and then the interrupting procedure S3 is carried out.

Specifically, in step S22, the processor 18 determines whether one of the environment values is at or outside a boundary defined with respect to the relevant environment factor. For example, with respect to the environment factor of ambient humidity, the ambient humidity value serves as the environmental value, and the humidity threshold defines an upper boundary for the ambient humidity. In the case that the ambient humidity value is greater than or equal to the humidity threshold, it means that it may be raining at the mowing area A1, and the interruption condition related to the environment factor of ambient humidity is met, and the mowing procedure S1 should be interrupted.

In another example, with respect to the environment factor of ambient temperature, the ambient temperature value serves as the environmental value, and there are two temperature thresholds, namely a temperature upper threshold and a temperature lower threshold, that define upper and lower boundaries for the ambient temperature. In the case that the ambient temperature value is greater than or equal to the temperature upper threshold, it means that it is extremely hot and the robot lawn mower 1 may become overheated and malfunction, and the interruption condition related to the environment factor of ambient temperature is met. In another case that the ambient temperature value is less than or equal to the temperature lower threshold, it means that it is extremely cold and the lawn may be frosted over so it is not a suitable time for mowing, and the interruption condition related to the environment factor of ambient temperature is met.

In step S23, the processor 18 determines whether one of the operation values is at or outside a boundary defined with respect to the relevant operation factor. For example, with respect to the operation factor of the remaining power of the power supply 12, the remaining power value serves as the operation value, and the remaining power threshold defines a lower boundary for the remaining power. In the case that the remaining power value is less than or equal to the remaining power threshold, it means that the power supply 12 is in a low power state, and the robot lawn mower 1 will soon be unable to operate due to lack of power. Thus, the interruption condition related to the operation factor of the remaining power is met, and the mowing procedure S1 should be interrupted.

It is noted that, in this embodiment, the remaining power threshold may be determined by the processor 18 based on the set of map data. Specifically, the remaining power corresponding to the remaining power threshold should be at least sufficient for the robot lawn mower 1 to move to one of the docking location A2 and the standby location A3 from a location in the mowing area A1 furthest away from said one of the docking location A2 and the standby location A3.

As another example, with respect to the operation factor of rotational speed of the cutter, the rotational speed value serves as the operation value, and the rotational speed threshold defines a lower boundary for the rotational speed. In the case that the rotational speed value is less than or equal to the rotational speed threshold, it means that the speed of the cutting device 13 is unable to read a normal operating speed, and the robot lawn mower 1 may be malfunctioning (e.g., something is caught in the cutting device 13), and the interruption condition related to the operation factor of rotational speed is met.

As a further example, with respect to the operation factor of the temperature of the cutter driver, the operating temperature value serves as the operation value, and the operating temperature threshold defines an upper boundary for the temperature of the cutter device. In the case that the operating temperature value is greater than or equal to the operating temperature threshold, it means that the cutter-driver has overheated, and the interruption condition related to the operation factor of the temperature of the cutter driver is met.

Referring to FIGS. 3 and 4, in the case that any one of the above-mentioned interruption conditions is met (step S24), the mowing procedure S1 is interrupted, and the interrupting procedure S3 should be performed (detailed below). In addition, the processor 18 may generate and transmit an interruption notice to the user device 5, thereby informing the user that the mowing procedure S1 has been interrupted. The interruption notice may indicate one of the interruption conditions that is met.

However, in the case that it is determined that none of the above-mentioned interruption conditions is met, the processor 18 continues to execute the mowing procedure S1, and then determines whether the chassis 11 has completed an entire course of moving along a predetermined mowing path based on the set of positioning data (namely, determining whether the robot lawn mower 1 has completed one mowing cycle) (S10).

When the chassis 11 has not completed the entire course of moving along the mowing path, the processor 18 controls the chassis 11 to continue moving along the mowing path (S11), and controls the cutting device 13 to cut grass as the chassis 11 moves along the mowing path (S12). The mowing path may be planned by the processor 18 based on the set of positioning data and the set of map data at the beginning of the mowing procedure S1. Alternatively, the mowing path may be planned when the user device 5 generates the set of map data and be included in the set of map data. While following the mowing path, the chassis 11 may move back and forth in the mowing area A1 to bypass the barrier areas A4. Since the mowing path and the manner in which the mowing path is planned are known and are not the features of this disclosure, the details thereof are not described herein.

Upon determining that the chassis 11 has completed the entire course of moving along the mowing path, the processor 18 executes a process of completion-recording (S14). Specifically, the processor 18 controls the chassis 11 to move to the image-capturing locations (P) sequentially, and controls the image capturing unit 15 to capture one or multiple images when the chassis 11 arrives at each of the image-capturing locations (P), so as to generate a set of image data that shows the mowing area A1 and that serves as a record of completion. The set of image data may have multiple images with different viewing angles and may be transmitted to the user device 5 for the user to view the mowing result of the mowing procedure S1 executed by the robot lawn mower 1.

Finally, the processor 18 controls the chassis 11 to move to the docking location A2 (S15). When the chassis 11 arrives at the docking location A2, the processor 18 may generate and transmit a notification to the user device 5, informing the user that the mowing procedure S1 has been completed. Furthermore, the processor 18 may control the robot lawn mower 1 to switch to a sleep mode to save power consumption.

Figure 5:
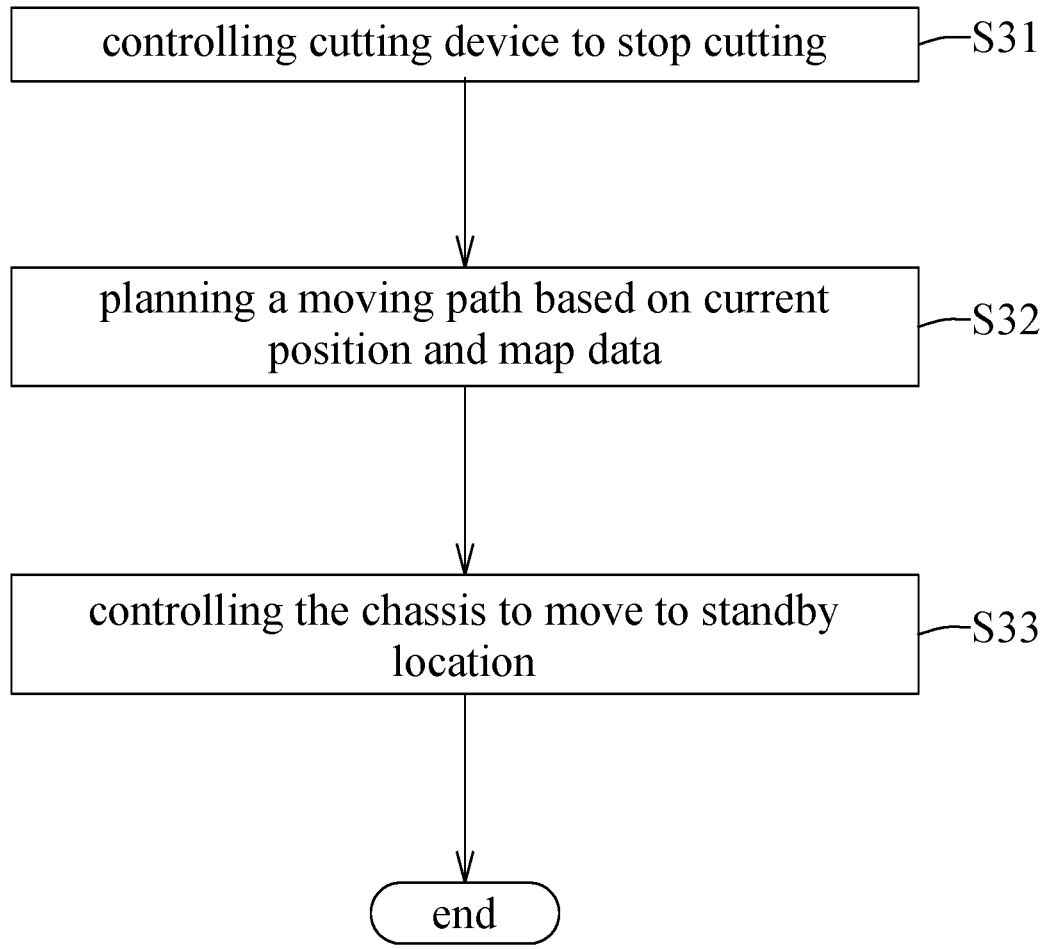

Referring to FIG. 5, in the case that it is determined that any one of the interruption conditions is met, the interrupting procedure S3 including steps S31-S33 is executed. In step S31, the processor 18 controls the cutting device 13 to stop cutting grass.

In step S32, the processor 18 plans a moving path from a current location of the robot lawn mower 1 to the standby location A3 based on the set of positioning data and the set of map data. For example, the processor 18 may plan the moving path based on the standby location A3 and the plurality of barrier areas A4.

In step S33, the processor 18 controls the chassis 11 to move along the moving path to the standby location A3. Then, the processor 18 may control the robot lawn mower 1 to switch to the sleep mode.

Figure 6:
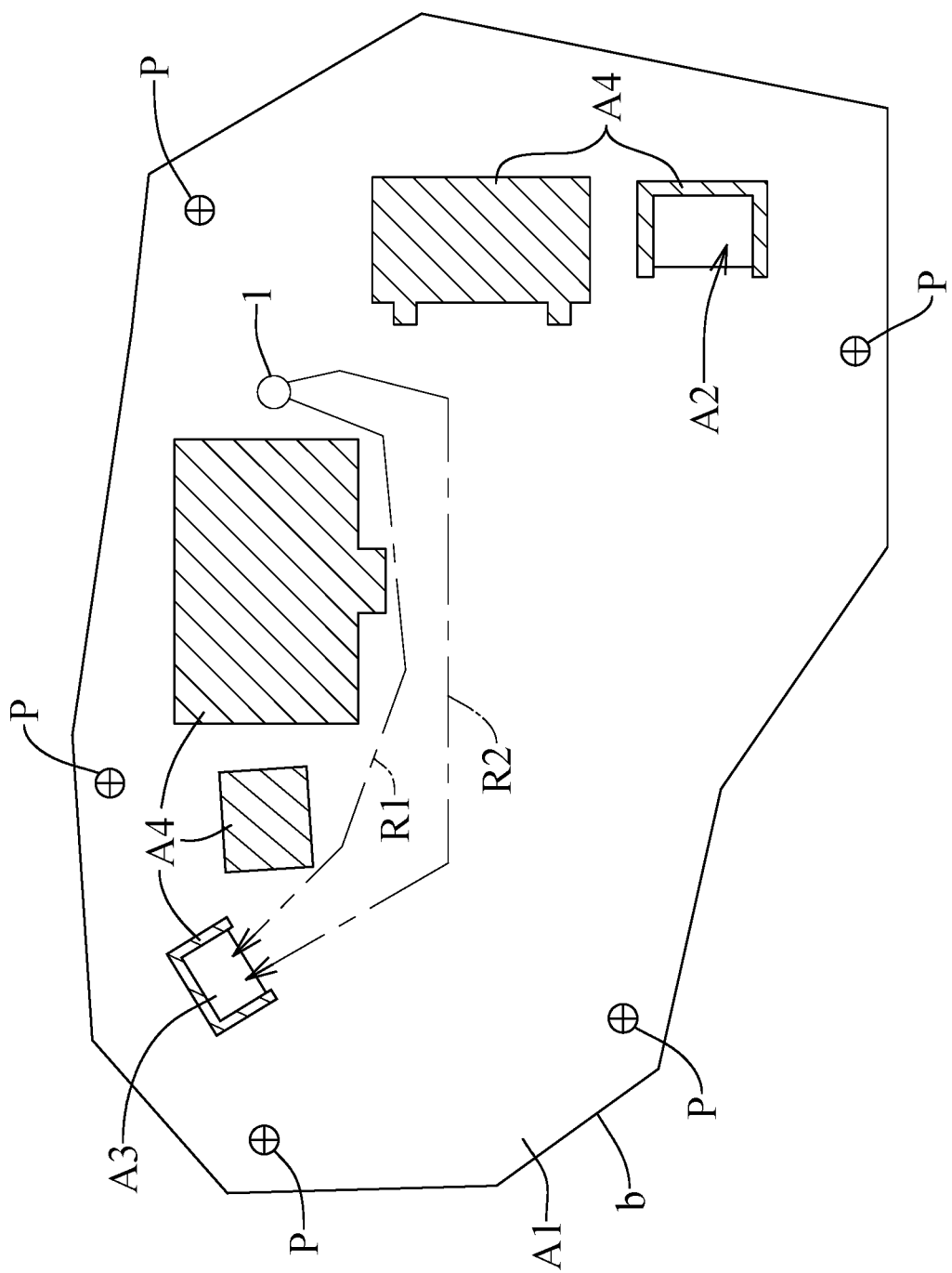
FIG. 6 is a schematic view illustrating a shortest path and a safety path from a current location to the standby location.

It is noted that the robot lawn mower 1 may be severely damaged by lightning during rainfall, and strong rain may cause water to enter an internal circuit of the robot lawn mower 1. Thus, when the ambient humidity value is greater than or equal to the humidity threshold, the robot lawn mower 1 faces a higher risk of damage than when other interruption conditions are met. In order to reduce the risk faced by the robot lawn mower 1, the processor 18 plans a shortest path from the current location to the standby location A3 to serve as the moving path by using, for example, Dijkstra's algorithm. Referring to FIG. 6, in this case, a shortest path R1 is designated as the moving path that allows the robot lawn mower 1 to move from the current location to the standby location A3 as soon as possible.

In addition, in the case that the remaining power value is less than or equal to the remaining power threshold, the processor 18 may use Dijkstra's algorithm to plan the shortest path to serve as the moving path as well, so as to prevent the robot lawn mower 1 from being unable to arrive at the standby location A3 before the power is exhausted.

As for other interruption conditions (e.g., the ambient temperature value being greater than or equal to the temperature upper threshold, the ambient temperature value being less than or equal to the temperature lower threshold, the rotational speed value being less than or equal to the rotational speed threshold, or the operating temperature value being greater than or equal to the operating temperature threshold), the processor 18 may use the Best-First Search algorithm or the A* (A Star) search algorithm to plan the moving path in such a way that the chassis 11 would not be overly close to the barrier areas A4. As shown in FIG. 6, a safe path R2 is designated as the moving path in these cases, so as to avoid accidents (e.g., crashing, overturning or getting stuck, etc.) caused by the robot lawn mower 1 being too close to the barrier areas A4.

In some embodiments, there are a plurality of standby locations A3 in the mowing area A1. The processor 18, in step S32, may determine a nearest one of the standby locations A3 with respect to the robot lawn mower 1, and plan the moving path based on the set of positioning data to the nearest one of the standby locations A3.

In summary, by implementing the controlling method of this disclosure, the processor 18 may stop the mowing procedure and control the chassis 11 to move to the preset standby location in case of unfavorable conditions such as rainfall, excessive heat, lack of power, and failure of the cutting device 13, so as to reduce or avoid damage to the robot lawn mower 1 or the need for the user to retrieve the robot lawn mower 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A controlling method of a robot lawn mower, the robot law mower including a chassis, and a cutting device, a sensor unit and a processor that are mounted on the chassis, the processor electrically connected to the cutting device and the sensor unit, said controlling method to be implemented by the processor and comprising:

a mowing procedure including steps of controlling the chassis to move along a predetermined mowing path in a mowing area, and controlling the cutting device to cut grass as the chassis moves along the mowing path;

an interruption determining procedure to be executed during the mowing procedure, and including steps of receiving sensing data from the sensor unit, wherein the sensing data indicates a current sensing result related to at least one of surrounding environment or an operation status of the robot lawn mower, and determining, based on the sensing data, whether an interruption condition related to at least one of an environment factor or an operation factor of the robot lawn mower is met; and an interrupting procedure to be executed when it is determined that the interruption condition is met in the interruption determining procedure, and including steps of controlling the cutting device to stop cutting grass, and controlling the chassis to move to a preset standby location;

the robot lawn mower further including an image capturing unit electrically connected to the processor, wherein the mowing procedure further includes steps of:

upon determining that the chassis has completed an entire course of moving along the mowing path, controlling the chassis to move to at least one preset image-capturing location;

controlling the image capturing unit to capture at least one image when the chassis arrives at each of the at least one preset image-capturing location, so as to generate and store a set of image data that shows the mowing area, and controlling the chassis to move to a preset docking location.

2. The controlling method of claim 1, the robot lawn mower further including a storage device that is electrically connected to the processor and that stores a critical value of the environment factor, the current sensing result including an environmental value related to the surrounding environment of the robot lawn mower;

wherein the step of determining whether an interruption condition is met in the interruption determining procedure includes determining whether the environmental value is at or outside a boundary defined by the critical value of the environment factor.

3. The controlling method of claim 2, the sensor unit including a humidity sensor for detecting ambient humidity and accordingly generating an ambient humidity value that serves as the environmental value, the storage device storing a humidity threshold that serves as the critical value of the environment factor, wherein the step of determining whether the environmental value is at or outside the boundary of the environment factor includes determining whether the ambient humidity value is greater than or equal to the humidity threshold.

4. The controlling method of claim 3, the robot lawn mower further including a positioning unit that is electrically connected to the processor and that is configured to perform positioning and generate a set of positioning data indicating a current location of the robot lawn mower; the storage device further storing a set of map data indicating the preset standby location;

wherein said interrupting procedure further includes, when it is determined that the ambient humidity value is greater than or equal to the humidity threshold, planning a shortest path from the current location to the preset standby location to serve as a moving path using Dijkstra's algorithm; and wherein the step of controlling the chassis to move to a preset standby location is to control the chassis to move to the preset standby location along the moving path.

5. The controlling method of claim 2, the sensor unit including a temperature sensor for detecting ambient temperature and accordingly generating an ambient temperature value that serves as the environmental value, the storage device storing at least one of a temperature upper threshold and a temperature lower threshold that serve as the critical value of the environment factor; and wherein the step of determining whether the environmental value is at or outside the boundary of the environment factor includes determining at least one of whether the ambient temperature value is greater than or equal to the temperature upper threshold, or whether the ambient temperature value is less than or equal to the temperature lower threshold.

6. The controlling method of claim 1, the robot lawn mower further including a storage device that is electrically connected to the processor and that stores a critical value of the operation factor, the current sensing result including an operation value related to the operation status of the robot lawn mower;

wherein the step of determining whether an interruption condition is met in the interruption determining procedure includes determining whether the operation value is at or outside a boundary defined by the critical value of the operation factor.

7. The controlling method of claim 6, the robot lawn mower further including a power supply electrically connected to the processor, the chassis and the cutting device for providing power required for operations thereof, the sensor unit including a power sensor electrically connected to the power supply for detecting remaining power of the power supply and accordingly generating a remaining power value that serves as the operation value, the storage device storing a remaining power threshold that serves as the critical value of the operation factor;

wherein the step of determining whether the operation value is at or outside the boundary of the operation factor includes determining whether the remaining power value is less than or equal to the remaining power threshold.

8. The controlling method of claim 6, the sensor unit including a speed sensor for detecting rotational speed of the cutting device and accordingly generating a rotational speed value that serves as the operation value; the storage device storing a rotational speed threshold that serves as the critical value of the operation factor, wherein the step of determining whether the operation value is at or outside the boundary of the operation factor includes determining whether the rotational speed value is less than or equal to the rotational speed threshold.

9. The controlling method of claim 1, the robot lawn mower further including a positioning unit that is electrically connected to the processor and that is configured to perform positioning and generate a set of positioning data for the robot lawn mower, and a storage device that is electrically connected to the processor and that stores a set of map data indicating the preset standby location; wherein the step of controlling the chassis to move to a preset standby location in the interrupting procedure includes planning a moving path based on the set of positioning data and the set of map data, and controlling the chassis to move to the preset standby location along the moving path.

10. A robot lawn mower, comprising a chassis, and a cutting device, a sensor unit and a processor that are mounted on said chassis, said processor electrically connected to said cutting device and said sensor unit; wherein said processor is configured to implement the controlling method of claim 1.

\* \* \* \* \*